United States Patent

Siddiqui et al.

[11] Patent Number: 6,095,561
[45] Date of Patent: Aug. 1, 2000

[54] MULTI-CHAMBER INFLATOR

[75] Inventors: Shahid A. Siddiqui, Farmington Hills; Rickey Lee Stratton, Pontiac, both of Mich.

[73] Assignee: Automotive Systems Laboratory, Inc., Farmington Hills, Mich.

[21] Appl. No.: 09/036,885

[22] Filed: Mar. 5, 1998

Related U.S. Application Data

[60] Provisional application No. 60/040,637, Mar. 7, 1997.

[51] Int. Cl.[7] .................................................. B60R 21/28
[52] U.S. Cl. ........................................... 280/742; 280/741
[58] Field of Search ...................................... 280/741, 742

[56] References Cited

U.S. PATENT DOCUMENTS

| | | | |
|---|---|---|---|
| 4,944,527 | 7/1990 | Bisop et al. | 280/741 |
| 5,400,487 | 3/1995 | Gioutsos et al. | 280/735 |
| 5,547,217 | 8/1996 | Selenak et al. | 280/741 |
| 5,564,743 | 10/1996 | Marchant | 280/741 |
| 5,613,705 | 3/1997 | Hock et al. | 280/741 |
| 5,628,528 | 5/1997 | Desautelle et al. | 280/741 |
| 5,658,010 | 8/1997 | Steffens, Jr. et al. | 280/741 |
| 5,794,973 | 8/1998 | O'Loughlin et al. | 280/741 |
| 5,799,973 | 9/1998 | Bauer et al. | 280/741 |
| 5,851,027 | 12/1998 | DiGiacomo et al. | 280/741 |
| 5,934,705 | 8/1999 | Siddiqui et al. | 280/736 |

Primary Examiner—Brian L. Johnson
Assistant Examiner—Michael Britton
Attorney, Agent, or Firm—Lyon, P.C.

[57] ABSTRACT

A gas generator utilizes two segregated propellant container/combustion chambers, each having a plurality of nonazide propellant grains therein, and each having an igniter for separately igniting the propellant grains located within the respective chambers. A perforated insulating tube disposed between the two chambers precludes flame front and thermal propagation from one chamber to another, thus preventing redeployment of an activated airbag. Alternatively, a gas generator may contain two separate inflator subassemblies insulated to prevent heat conduction from one subassembly to another.

10 Claims, 1 Drawing Sheet

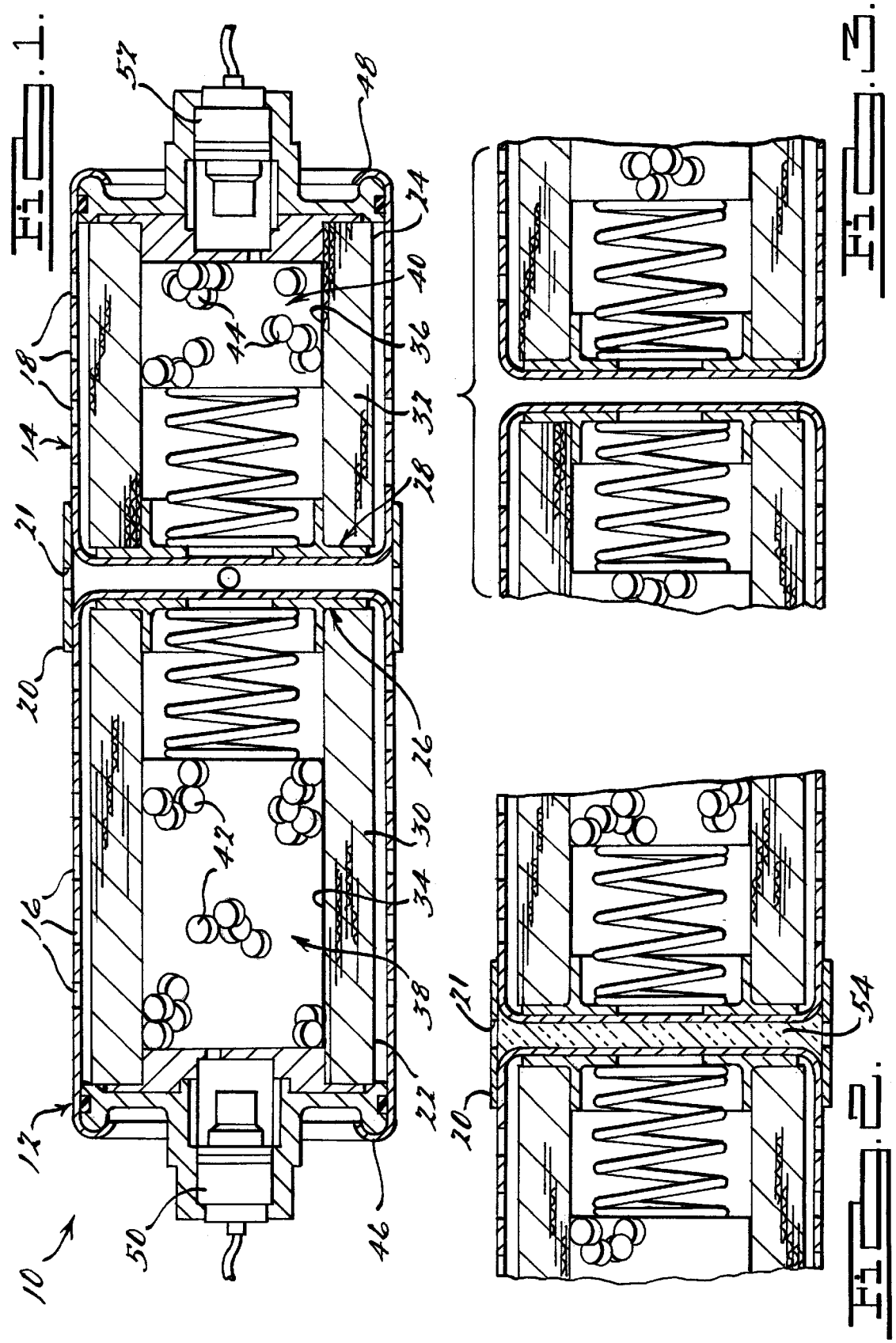

MULTI-CHAMBER INFLATOR

CROSS-REFERENCE TO RELATED APPLICATION

This application claims the benefit of Provisional Application Ser. No. 60/040,637, filed on Mar. 7, 1997.

FIELD OF THE INVENTION

The present invention generally relates to gas generators such as used to inflate air bags in an automobile occupant protection system, and more particularly to an improved gas generator having a dual-chamber inflator body wherein each chamber operates independently of the other.

BACKGROUND OF THE INVENTION

The prior art generally discloses inflation systems for deploying an air bag in a motor vehicle which comprise a single gas generator in fluid communication with the uninflated air bag. The gas generator is typically triggered by an air bag firing circuit when the sensed vehicle acceleration exceeds a predetermined threshold value, as through the use of an acceleration-responsive inertial switch and an explosive "squib."

Conventional single gas generator inflation systems suffer from the disadvantage that the onset pressurization/inflation rate is generally set to provide an aggressive or rapid initial inflation in order to achieve a particular inflation time even for an occupant positioned relatively close to the air bag. However, an aggressive and uncontrolled onset rate of pressurization becomes problematic in situations where the occupant is out of position. More specifically, the rapid pressurization can cause the air bag to impact against the occupant with enough force to injure the occupant.

Occasionally, when single gas generator inflation systems are deployed, smaller occupants, usually children and smaller women, have been seriously injured. The airbag volume and inflating capacity are designed to protect both large and small occupants and are generally not variable within the single gas generator. Therefore, the inflation rate and volume of the airbag may result in an impact potentially hazardous to smaller occupants.

In commonly owned U.S. Pat. No. 5,400,487, Gioutsos et al teach an inflation system which overcomes the above-described problems by utilizing a plurality of gas generators which are controllably ignited to provide a variable inflation profile which can be tailored to any given occupant weight and/or position and for any crash type. While this arrangement dramatically improves the inflation efficiency so as to maximize an air bag's ability to protect an occupant, it does so at significantly higher expense and complexity. More specifically, the multiple gas generators and squibs add considerable cost to the system, while the firing control circuitry requires sophisticated processors capable of accurately timing the various ignition times.

Other designs include nonazide multi- or dual-chamber systems that selectively deploy depending on design criteria such as the positioning and/or weight of the occupant, or on the force of the collision. Dual-chamber systems such as these are generally manufactured by welding the integral end closures of two inflator housings together, whereby two chambers are joined with a separating wall there between. Each housing is of a predetermined size that is determinative of the nonazide propellant capacity and consequently, of the inflating capability of each chamber. Upon collision, depending on the weight of the passenger, either chamber or both may be selectively ignited thereby inflating the protective airbag.

However, the inherently high ignition temperature of a nonazide propellant charge located in the first chamber may produce enough heat energy to heat the separating wall and conductively ignite the nonazide propellant charge located in the second chamber. Therefore, one disadvantage of conventional dual-chamber inflators is the potential unintended ignition of an adjoining secondary chamber once a selected first chamber has been ignited. When attempting to leave the vehicle after a collision, occupants in positions skewed to the normal riding position may expose themselves to potential injury should an inflator inadvertently ignite and redeploy the airbag. Furthermore, rescuers attempting to remove the occupants from their vehicle may assume positions that could prove harmful should an airbag redeploy unexpectedly.

Therefore, a need still exists for a gas generator that can satisfactorily produce variable inflation pressurization, and yet preclude hazardous redeployment of the system airbag.

SUMMARY OF THE INVENTION

Accordingly, it is an object of the present invention to provide an improved gas generator for use in a vehicle air bag inflation system which can satisfactorily produce variable inflation pressurization without inadvertent deployment of a second juxtaposed inflator system.

Another object of the present invention is to provide a dual-chamber system that utilizes separate igniters and propellant beds, wherein each chamber operates independently of the other.

In accordance with these and other objects, the present invention includes a gas generator having at least two subassemblies, each subassembly containing a combustion chamber formed within a housing. Each chamber may be tailored to meet a desired inflation pressure thereby providing variable inflation pressurization. A perforated tube connects the two subassemblies and insulates one from the other by virtue of the insulating air gap created between the two chambers. If desired, an inert heat insulator may be inserted within the air gap thereby further insulating one chamber from another.

Alternatively, the same objectives can be accomplished by simply placing two separate inflator subassemblies in close proximity but not in contact with each other. The air gap or insulation existing between the two chambers will provide the same function as that created from the connecting tube described above.

The present invention will be more fully understood upon reading the following detailed description of the preferred embodiment in conjunction with the accompanying drawings.

BRIEF DESCRIPTION OF THE DRAWING

FIG. 1 is a longitudinal cross-sectional view of an inflator having two inflator subassemblies connected by a perforated tube in a first exemplary embodiment.

FIG. 2 is a longitudinal cross-sectional view of an inflator having two inflator subassemblies as in FIG. 1, but also having an inert heat insulator within the perforated tube in a second exemplary embodiment.

FIG. 3 is a longitudinal cross-sectional view of two inflator subassemblies in a passenger restraint system, each separated from one another by air or insulation in a third exemplary embodiment.

DETAILED DESCRIPTION OF THE PREFERRED EMBODIMENT(S)

As seen in the drawings, a dual-chambered inflator 10 having particular utility for use in, for example, an automobile occupant restraint system, comprises two cylindrical housings 12 and 14. Two pluralities of gas discharge orifices 16 and 18 are circumferentially disposed about housings 12 and 14, respectively. In accordance with the present invention, an insulating tube 20 connects both housings to each other. A plurality of heat-radiating orifices 21 are circumferentially disposed within tube 20. Housings 12 and 14 define first and second inflator subassemblies 22 and 24, respectively.

A first and second endcap 26 and 28, each abut an opposite side of tube 20 Optional first and second autoignition cups may be press fitted against endcaps 26 and 28, respectively. A first and second filter assembly 30 and 32 extend longitudinally within housings 12 and 14, respectively, and are press fitted against endcaps 26 and 28, respectively. A first inner radial surface 34 of filter 30 forms a first chamber 38, and a second inner radial surface 36 of filter 32 forms a second chamber 40. A first and second bed of non-azide propellant grains 42 and 44 are stored within chambers 38 and 40, respectively. Optional first and second propellant foils may be included to form laminar covers over radial inner surfaces 34 and 36, respectively, thereby providing increased pressure and enhanced flame front propagation within each subassembly. A crimped first end closure 46 seals subassembly 12, and a crimped second end closure 48 seals subassembly 14. Each end closure 46 and 48 accepts a conventional igniter 50 and 52, respectively, for selective ignition of corresponding propellant grains 42 and 44.

In accordance with the present invention, insulating tube 20 functions to preclude flame front and heat propagation from one chamber to another. As shown in FIG. 2 and in accordance with a second aspect of the invention, an inert heat insulator 54 may be inserted within tube 20. The insulation 54 may be formed from any suitable insulating material such as reinforced plastic or ceramic, or carbon yarn. Reinforced plastic discs known as "haysite" are obtainable from, for example, the Haysite Co. located in Erie, Pa. As taught in coowned and copending application Ser. No. 09/012,021 entitled, "INFLATOR FILTER COMPRISING CARBON YARN", herein incorporated by reference, carbon yarn is obtainable from Fuji Filter Mfg. Co., LTD., Tokyo Japan. Conductive heat transfer is thereby prevented from one chamber to another, and as such, inadvertent deployment of a dormant airbag is precluded.

The dual-chambered inflator 10 can be easily manufactured by first forming subassemblies 22 and 24. By way of illustration, filters 30 and 32, may be constructed as taught in the co-owned and copending application having Ser. No. 08,700,819 and entitled, "AIR BAG INFLATOR", the teachings of which are herein incorporated by reference. For example, each filter may comprise alternating layers of respective filtration media extending radially outwardly from chambers 38 and 40. Either filter may comprise any layered permutation of pierced stainless steel sheet metal, mesh stainless steel wire cloth obtainable from Wayne Wire Cloth, Hillman, Mich., and ceramic filter media such as Unifrax #204LE obtainable from Unifrax Corporation, Niagara, N.Y.

The aforesaid layered construction of filters 30 and 32 presents relatively course and heavy material to the high temperature gaseous products of combustion thereby functioning as a heat sink for the removal of heat and course particulates therefrom. Subsequently, relatively finer mesh wire cloth and the ceramic media effects the removal of fine particulates from the gas stream.

Because filters 30 and 32 are of right circular cylindrical configuration, they are easily formed into an assembly as, for example, by rolling and welding as taught in U.S. Pat. No. 5,547,217, also assigned to the assignee of the present invention and herein incorporated by reference. Once the filters are formed, the remaining components may be installed as described above by methods well known in the art. Completed subassemblies 22 and 24 are then connected to tube 20 by laser welding for example.

In operation, either chamber 38 or 40, or both, are selectively ignited depending on the input to the system software. Thereafter, combustion gas flows radially outwardly from either propellant chamber 38 or 40, thence radially outwardly and circumferentially past either filter 30 or 32 thence exiting the inflator 10 through apertures 16 or 18 Exclusive operation of either chamber is ensured due to insulating tube 20 whereas inadvertent redeployment of the airbag is thus prevented.

Alternatively, as shown in FIG. 3, a complete inflator may include two inflator subassemblies separated by either air or an inert heat insulator. Either inflator subassembly may then be selectively and independently ignited by virtue of the insulating properties of air or other inert insulating materials existing between each subassembly.

It will be understood that the foregoing description of the preferred embodiment of the present invention is for illustrative purposes only, and that the various structural and operational features herein disclosed are susceptible to a number of modifications, none of which departs from the spirit and scope of the present invention as defined in the appended claims.

We claim:

1. An air bag inflator comprising:
   a first elongated and perforated cylindrical housing;
   a second elongated and perforated cylindrical housing;
   a first elongated and perforated cylindrical filter disposed radially inwardly of an inner wall of said first housing;
   a second elongated and perforated cylindrical filter disposed radially inwardly of an inner wall of said second housing;
   a first propellant chamber within said first filter;
   a second propellant chamber within said second filter;
   a perforated hollow tube connecting said first and second housings whereby heat transfer and flame propagation are eliminated therebetween and each chamber operates independently of the other;
   a first propellant located within said first propellant chamber;
   a second propellant located within said second propellant chamber;
   a first means for igniting said first propellant; and
   a second means for igniting said second propellant.

2. The inflator of claim 1 further comprising an inert heat insulator contained within said tube.

3. The inflator of claim 2 wherein said insulator comprises ceramic.

4. The inflator of claim 2 wherein said insulator comprises plastic.

5. The inflator of claim 2 wherein said insulator comprises carbon yarn.

6. An air bag inflator comprising:
   a first inflator subassembly further comprising:
      a first elongated and perforated cylindrical housing;
      a first elongated and perforated cylindrical filter disposed radially inwardly of an inner wall of said first housing;

a first propellant chamber within said first filter;
a first propellant located within said first propellant chamber; and
a first means for igniting said first propellant;
a second inflator subassembly axially aligned with said first inflator subassembly further comprising:
a second elongated and perforated cylindrical housing;
a second elongated and perforated cylindrical filter disposed radially inwardly of an inner wall of said second housing;
a second propellant chamber within said second filter;
a second propellant located within said second propellant chamber;

a second means for igniting said second propellant; and,
an inert heat insulator between said first and second subassemblies thereby preventing heat conduction between said first housing and said second housing.

7. The inflator of claim 6 wherein said insulator comprises air.

8. The inflator of claim 6 wherein said insulator comprises ceramic.

9. The inflator of claim 6 wherein said insulator comprises plastic.

10. The inflator of claim 6 wherein said insulator comprises carbon yarn.

* * * * *